United States Patent
Spitschka

(10) Patent No.: US 10,361,797 B1
(45) Date of Patent: Jul. 23, 2019

(54) WIRELESS TESTING DEVICE AND METHOD FOR TIMING ERROR MEASUREMENTS USING INTERFACE SPACE MARKER INFORMATION

(71) Applicant: Rohde & Schwarz GmbH & Co. KG, Munich (DE)

(72) Inventor: Ralph Spitschka, Forstinning (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 0 days.

(21) Appl. No.: 15/875,542

(22) Filed: Jan. 19, 2018

(51) Int. Cl.
*H04B 17/21* (2015.01)
*H04W 24/06* (2009.01)

(52) U.S. Cl.
CPC ............ *H04B 17/21* (2015.01); *H04W 24/06* (2013.01)

(58) Field of Classification Search
CPC ........ H04B 17/21; H04B 17/15; H04B 17/16; H04B 17/104; H04B 17/29
See application file for complete search history.

(56) References Cited

U.S. PATENT DOCUMENTS

| | | | |
|---|---|---|---|
| 5,832,045 A | 11/1998 | Barber | |
| 2014/0119421 A1* | 5/2014 | El-Hassan | H04B 17/29 375/227 |
| 2014/0341056 A1* | 11/2014 | Carbajal | H04W 24/08 370/252 |
| 2015/0257019 A1* | 9/2015 | Durai | H04L 1/24 370/252 |
| 2016/0242177 A1* | 8/2016 | Seok | H04W 72/0446 |
| 2016/0261303 A1* | 9/2016 | Hsu | H04B 1/44 |
| 2017/0048048 A1* | 2/2017 | Seok | H04L 5/0055 |
| 2017/0150493 A1* | 5/2017 | Seok | H04B 7/0452 |
| 2017/0164387 A1* | 6/2017 | Lou | H04B 7/0452 |

OTHER PUBLICATIONS

Lukez, "802.11ax: Not just another higher data rate", Published in EDN Network Guest Column, Mar. 31, 2017.*
Lukez, "Timing matters for 802.11ax users", Published in EDN Asia, Apr. 17, 2017.*
Schmid, "Generating WLAN IEEE 802.11ax Signals", Published in Rohde & Schwarz 08.2017—1GP115_0E, Aug. 2017.*
Ward, "IEEE 802.11ax Technology Introduction White Paper", Published in Rohde & Schwarz 10.2016-MA222_Oe, on May 16, 2017, retrieved on Jan. 19, 2018, from http://www.rohde-schwarz.com/appnote/1MA222, 34 pages.

* cited by examiner

*Primary Examiner* — Devan A Sandiford
(74) *Attorney, Agent, or Firm* — Ditthavong & Steiner P.C.

(57) ABSTRACT

A wireless radio tester for testing a device under test is provided. The wireless radio tester comprises a generation unit for transmitting a transmit waveform to the device under test, a measurement unit for receiving and analyzing a receive signal received from the device under test, a processing unit for triggering the measurement unit by interframe space marker information, and a IQ data memory configured to provide IQ data for the generation unit in order to form the transmit waveform. In this context, said IQ data comprises an interframe space marker according to the interframe space marker information.

16 Claims, 4 Drawing Sheets

WIRELESS TESTING DEVICE AND METHOD FOR TIMING ERROR MEASUREMENTS USING INTERFACE SPACE MARKER INFORMATION

TECHNICAL FIELD

The invention relates to a testing device, especially a wireless radio tester, and a wireless radio testing method for performing timing error measurements with respect to a device under test in order to verify its proper functioning.

BACKGROUND ART

Generally, in times of an increasing number of wireless communication applications such as WLAN (Wireless Local Area Network) systems, there is a growing need of a testing device and a testing method for performing timing error measurements with respect to devices under test applying such systems in order to verify their proper functioning.

U.S. Pat. No. 5,832,045 relates in general to communication systems and is particularly directed to a technique for deriving baud timing for sampling a received signal, by correlating measured intersymbol interference between adjacent bits of a received data stream to derive a timing error signal, which drives a baud timing recovery loop that generates the sampling clock signal. In this context, deriving the timing error signal from the intersymbol interference requires a complex setup, which leads to high costs and is therefore inefficient.

Accordingly, there is a need to provide a testing device and a testing method for performing timing error measurements with respect to a device under test in an efficient and cost-saving manner.

SUMMARY OF THE INVENTION

According to a first aspect of the invention, a wireless radio tester for testing a device under test is provided. The wireless radio tester comprises a generation unit for transmitting a transmit waveform to the device under test, a measurement unit for receiving and analyzing a receive signal received from the device under test, a processing unit for triggering the measurement unit by interframe space marker information, and an IQ data (inphase/quadratur phase base band data) memory configured to provide IQ data for the generation unit in order to form the transmit waveform. In this context, said IQ data comprises an interframe space marker according to the interframe space marker information. Advantageously, timing error measurements can be performed with respect to the device under test in an efficient and cost-saving manner.

According to a first preferred implementation form of the first aspect, the device under test is a station according to IEEE 802.11ax standard. Advantageously, especially stations according to the IEEE 802.11ax standard can be investigated with respect to timing errors and thus regarding their proper functioning.

According to a further preferred implementation form of the first aspect, the transmit waveform is a trigger frame burst. Alternatively, the transmit waveform may be a trigger frame. Advantageously, the trigger frame burst or the trigger frame, respectively, ensures high efficiency and low costs due to its simplicity.

According to a further preferred implementation form of the first aspect, the interframe space marker is set a specified time interval after a falling edge of the transmit waveform. Advantageously, timing error measurements are reproducible.

According to a further preferred implementation form of the first aspect, the specified time interval is taken out of the range from 12 microseconds to 20 microseconds, preferably taken out of the range from 14 microseconds to 18 microseconds, more preferably taken out of the range from 15 microseconds to 17 microseconds, and most preferably is 16 microseconds. Advantageously, said ranges or value, respectively, ensure a high accuracy.

According to a further preferred implementation form of the first aspect, the processing unit is configured to analyze a receive time of the receive signal in view of the interframe space marker. Advantageously, a timing error can be determined in an accurate manner.

According to a further preferred implementation form of the first aspect, the processing unit is further configured to determine a timing error as a time difference between the receive time and the interframe space marker. Advantageously, the timing error can be determined in an efficient and simple manner.

According to a further preferred implementation form of the first aspect, the timing error is within the range from −1.0 microsecond to 1.0 microsecond, preferably within the range from −0.6 microseconds to 0.6 microseconds, more preferably within the range from −0.5 microseconds to 0.5 microseconds, most preferably within the range from −0.4 microseconds to 0.4 microseconds. Advantageously, said ranges ensure a high accuracy.

According to a further preferred implementation form of the first aspect, the wireless radio tester simulates an access point, wherein the access point prompts a station, especially the device under test, to reply, with the aid of the transmit waveform, especially with the aid of information transmitted by the transmit waveform, wherein a reply of the station, especially of the device under test, preferably is an acknowledgement or a trigger based frame. Advantageously, the simulation of an access point allows for realistic measurements.

According to a second aspect of the invention, a wireless radio testing method for testing a device under test is provided. The wireless radio testing method comprises the steps of transmitting a transmit waveform to the device under test with the aid of a generation unit, receiving and analyzing a receive signal received from the device under test with the aid of a measurement unit, triggering the measurement unit by interframe space marker information, and providing IQ data for the generation unit in order to form the transmit waveform. In this context, said IQ data comprises an interframe space marker according to the interframe space marker information. Advantageously, timing error measurements can be performed with respect to the device under test in an efficient and cost-saving manner.

According to a first preferred implementation form of the second aspect, the device under test is a station according to IEEE 802.11ax standard. Advantageously, especially stations according to the IEEE 802.11ax standard can be investigated with respect to timing errors and thus regarding their proper functioning.

According to a further preferred implementation form of the second aspect, the transmit waveform is a trigger frame burst. Alternatively, the transmit waveform may be a trigger frame. Advantageously, the trigger frame burst or the trigger frame, respectively, ensures high efficiency and low costs due to its simplicity.

According to a further preferred implementation form of the second aspect, the interframe space marker is set a specified time interval after a falling edge of the transmit waveform. Advantageously, timing error measurements are reproducible.

According to a further preferred implementation form of the second aspect, the specified time interval is taken out of the range from 12 microseconds to 20 microseconds, preferably taken out of the range from 14 microseconds to 18 microseconds, more preferably taken out of the range from 15 microseconds to 17 microseconds, and most preferably is 16 microseconds. Advantageously, said ranges or value, respectively, ensure a high accuracy.

According to a further preferred implementation form of the second aspect, the wireless radio testing method further comprises the step of analyzing a receive time of the receive signal in view of the interframe space marker. Advantageously, a timing error can be determined in an accurate manner.

According to a further preferred implementation form of the second aspect, the wireless radio testing method further comprises the step of determining a timing error as a time difference between the receive time and the interframe space marker. Advantageously, the timing error can be determined in an efficient and simple manner.

According to a further preferred implementation form of the second aspect, the timing error is within the range from −1.0 microsecond to 1.0 microsecond, preferably within the range from −0.6 microseconds to 0.6 microseconds, more preferably within the range from −0.5 microseconds to 0.5 microseconds, most preferably within the range from −0.4 microseconds to 0.4 microseconds. Advantageously, said ranges ensure a high accuracy.

According to a further preferred implementation form of the second aspect, the wireless radio testing method further comprises the step of simulating an access point, wherein the access point prompts a station, especially the device under test, to reply, with the aid of the transmit waveform, especially with the aid of information transmitted by the transmit waveform, wherein a reply of the station, especially of the device under test, preferably is an acknowledgement or a trigger based frame. Advantageously, the simulation of an access point allows for realistic measurements.

BRIEF DESCRIPTION OF THE DRAWINGS

Exemplary embodiments of the invention are now further explained with respect to the drawings by way of example only, and not for limitation. In the drawings.

DETAILED DESCRIPTION OF THE PREFERRED EMBODIMENTS

Figure 1:
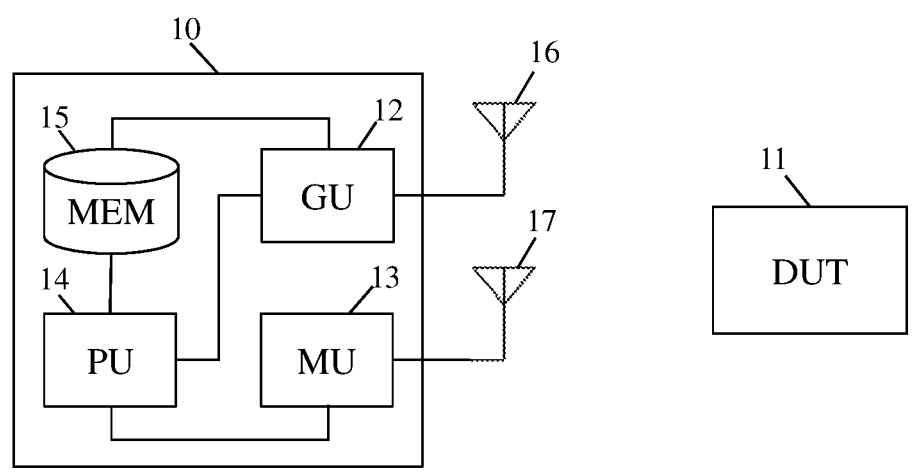
FIG. 1 shows an exemplary embodiment of the first aspect of the invention.

Firstly, FIG. 1 illustrates an exemplary embodiment of the inventive wireless radio tester 10 for testing a device under test 11. The wireless radio tester 10 comprises a generation unit 12 for transmitting a transmit waveform to the device under test 11, a measurement unit 13 for receiving and analyzing a receive signal received from the device under test 11, a processing unit 14 for triggering the measurement unit 13 by interframe space marker information, and an IQ data memory 15 configured to provide IQ data for the generation unit 12 in order to form the transmit waveform. In this context, said IQ data comprises an interframe space marker according to the interframe space marker information.

Furthermore, for transmitting the transmit waveform to the device under test 11, the generation unit 12 may advantageously be connected to an antenna 16. Alternatively, the generation unit 12 may be connected to an antenna array. In addition to this, the generation unit 12 may preferably be connected to the IQ data memory 15 in order to get IQ data from the IQ data memory for forming the transmit waveform. Additionally, the generation unit 12 may preferably be connected to the processing unit 14. In this context, said connection between the generation unit 12 and the processing unit 14 may preferably be used for exchanging information with special respect to the interframe space marker.

Moreover, for receiving the receive signal received from the device under test 11, the measurement unit 13 may preferably be connected to an antenna 17. Alternatively, the measurement unit 13 may be connected to an antenna array. In addition to this, for triggering the measurement unit 13 by interframe space marker information, the measurement unit 13 may preferably be connected to the processing unit 14. In this context, the processing unit 14 may preferably be connected to the IQ data memory 15 in order to especially get information with respect to the interframe space marker.

With respect to the device under test 11, it is noted that the device under test 11 may preferably be a station according to the IEEE 802.11ax standard.

Furthermore, with respect to the transmit waveform, it is noted that the transmit waveform may preferably be a trigger frame burst.

Moreover, with respect to the interframe space marker, it is noted that the interframe space marker may preferably be set a specified time interval after a falling edge of the transmit waveform. Said specified time interval may preferably be taken out of the range from 12 microseconds to 20 microseconds, preferably taken out of the range from 14 microseconds to 18 microseconds, more preferably taken out of the range from 15 microseconds to 17 microseconds, and most preferably is 16 microseconds.

With respect to the processing unit 14, it is noted that the processing unit 14 may preferably be configured to analyze a receive time of the receive signal in view of the interframe space marker. Further preferably, the processing unit 14 is may be configured to determine a timing error as a time difference between the receive time and the interframe space marker. Said timing error may preferably be within the range from −1.0 microsecond to 1.0 microsecond, preferably within the range from −0.6 microseconds to 0.6 microseconds, more preferably within the range from −0.5 microseconds to 0.5 microseconds, most preferably within the range from −0.4 microseconds to 0.4 microseconds.

Moreover, with respect to the wireless radio tester 10, it is noted that the wireless radio tester 10 preferably simulates an access point, wherein the access point prompts a station, especially the device under test 11, to reply, with the aid of the transmit waveform, especially with the aid of information transmitted by the transmit waveform, wherein a reply of the station, especially of the device under test 11, preferably is an acknowledgement or a trigger based frame.

In other words, with the aid of the transmit waveform, especially with the aid of the information contained by the transmit waveform, an access point, preferably a WLAN access point, more preferably an access point according to IEEE 802.11ax, is simulated. Said simulated access point prompts the station, especially the device under test 11, to reply. Said reply of the station, especially of the device under test 11, preferably is an acknowledgement or, especially in the case of the IEEE 802.11ax standard, a trigger based frame. In this context, with the aid of the acknowledgement or the trigger based frame, the station or the device under test 11, respectively, returns data to the access point. Preferably, said return of data is done in an OFDMA (orthogonal frequency-division multiple access) mode especially on predefined frequencies.

In addition to this, the transmit waveform comprises the interframe space marker. Preferably, said interframe space marker is set 16 microseconds after the end of the signal of the access point. Advantageously, said specific moment in time is equal to the point of time, at which the station, especially the device under test 11, has to start transmitting the acknowledgement or the trigger based frame, respectively. Further advantageously, within the wireless radio tester 10, the interframe space marker is passed from the generation unit 12 to the processing unit 14. In this manner, a temporal reference is provided for the processing unit 14 which is configured to determine the timing error of the station by calculating the temporal difference between the interframe space marker and the start, especially the start of a data burst, of the signal received from the station.

Figure 2:
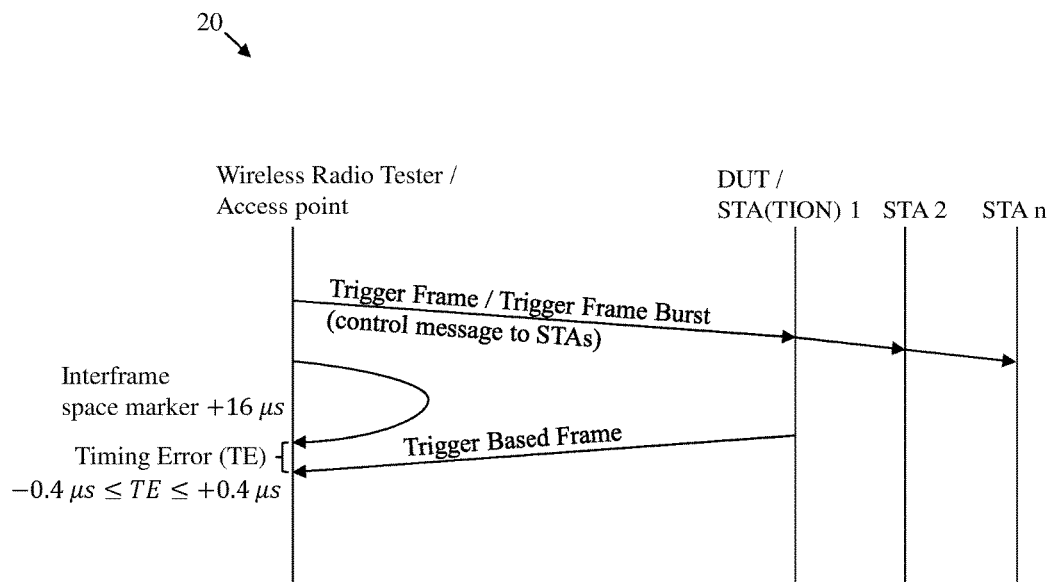
FIG. 2 shows an exemplary sequence diagram of a communication between a wireless radio tester and a device under test.
Figure 3:
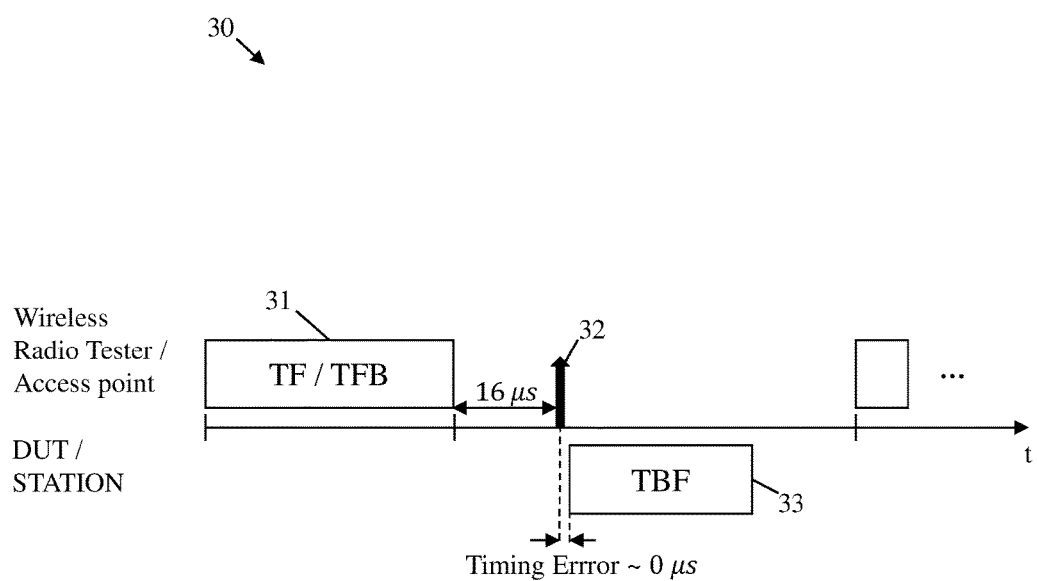
FIG. 3 shows an alternative exemplary presentation form of the communication according to FIG. 2.

Whereas FIG. 2 illustrates the above-described exemplary communication between the wireless radio tester 10 and the device under test 11, FIG. 3 depicts an alternative exemplary presentation form of said communication.

In this context, the wireless radio tester 10 sends a trigger frame or trigger frame burst 31 to the device under test 11 or station, respectively. Preferably, after 16 microseconds, the interframe space marker 32 is set. Afterwards, the station, especially the device under test 11, replies with the aid of the acknowledgement or trigger based frame 33.

Figure 4:
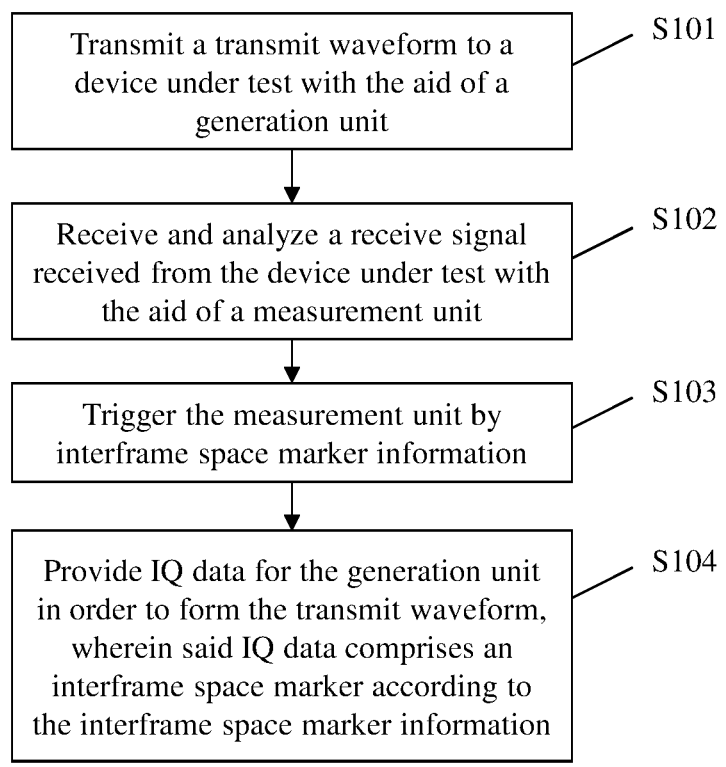
FIG. 4 shows a flow chart of an exemplary embodiment of the second aspect of the invention.

Finally, FIG. 4 shows a flow chart of the inventive method. In a first step S101, a transmit waveform is transmitted to a device under test with the aid of a generation unit. Then, in a second step S102, a receive signal received from the device under test is received and analyzed with the aid of a measurement unit. Furthermore, in a third step S103, the measurement unit is triggered by interframe space marker information. Moreover, in a fourth step S104, IQ data is provided for the generation unit in order to form the transmit waveform, wherein said IQ data comprises an interframe space marker according to the interframe space marker information.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A wireless radio tester for testing a device under test, the wireless radio tester comprising:
    a transmitter transmitting a transmit waveform to the device under test,
    a processor receiving and analyzing a receive signal received from the device under test,
    the processor being triggered by interframe space marker information, and
    an IQ data memory configured to provide IQ data for the transmitter in order to form the transmit waveform,
    wherein said IQ data comprises an interframe space marker according to the interframe space marker information,
    wherein the wireless radio tester simulates an access point, wherein the access point prompts the device under test, to reply, with the aid of information transmitted by the transmit waveform, wherein a reply of the device under test, is an acknowledgement or a trigger based frame,
    wherein with the aid of the acknowledgement or the trigger based frame, the device under test, returns data to the access point, wherein said return of data is done in an orthogonal frequency-division multiple access mode on predefined frequencies, and
    wherein the transmitter and the processor are connected for exchanging information with respect to the interframe space marker.

2. The wireless radio tester according to claim 1, wherein the device under test is a device working under the IEEE 802.11ax standard.

3. The wireless radio tester according to claim 1, wherein the transmit waveform is a trigger frame burst.

4. The wireless radio tester according to claim 1, wherein the interframe space marker is set a specified time interval after a falling edge of the transmit waveform.

5. The wireless radio tester according to claim 4, wherein the specified time interval is taken out of the range selected from 12 microseconds to 20 microseconds, 14 microseconds to 18 microseconds, 15 microseconds to 17 microseconds, or 16 microseconds.

6. The wireless radio tester according to claim 1, wherein the processor is configured to analyze a receive time of the receive signal in view of the interframe space marker.

7. The wireless radio tester according to claim 6, wherein the processor is further configured to determine a timing error as a time difference between the receive time and the interframe space marker.

8. The wireless radio tester according to claim 7, wherein the timing error is within the range selected from −1.0 microsecond to 1.0 microsecond, −0.6 microseconds to 0.6 microseconds, −0.5 microseconds to 0.5 microseconds, or −0.4 microseconds to 0.4 microseconds.

9. A wireless radio testing method for testing a device under test, the wireless radio testing method comprising the steps of:
    transmitting a transmit waveform to the device under test with the aid of a transmitter,
    receiving and analyzing a receive signal received from the device under test with the aid of a processor, triggering the processor by interframe space marker information, and providing IQ data for the transmitter in order to form the transmit waveform, wherein said IQ data comprises an interframe space marker according to the interframe space marker information, wherein the wireless radio testing method further comprises the step of simulating an access point, wherein the access point prompts the device under test, to reply, with the aid of information transmitted by the transmit waveform, wherein a reply of the device under test is an acknowledgement or a trigger based frame, wherein with the aid of the acknowledgement or the trigger based frame, the device under test, returns data to the access point, wherein said return of data is done in an orthogonal frequency-division multiple access mode on predefined frequencies, and wherein the transmitter and the processor are connected for exchanging information with respect to the interframe space marker.

10. The wireless radio testing method according to claim 9, wherein the device under test is a device working under the IEEE 802.11ax standard.

11. The wireless radio testing method according to claim 9, wherein the transmit waveform is a trigger frame burst.

12. The wireless radio testing method according to claim 9, wherein the interframe space marker is set a specified time interval after a falling edge of the transmit waveform.

13. The wireless radio testing method according to claim 12, wherein the specified time interval is taken out of the range selected from 12 microseconds to 20 microseconds, 14 microseconds to 18 microseconds, 15 microseconds to 17 microseconds, or 16 microseconds.

14. The wireless radio testing method according to claim 9, wherein the wireless radio testing method further comprises the step of analyzing a receive time of the receive signal in view of the interframe space marker.

15. The wireless radio testing method according to claim 14, wherein the wireless radio testing method further comprises the step of determining a timing error as a time difference between the receive time and the interframe space marker.

16. The wireless radio testing method according to claim 15, wherein the timing error is within the range selected from −1.0 microsecond to 1.0 microsecond, −0.6 microseconds to 0.6 microseconds, −0.5 microseconds to 0.5 microseconds, or −0.4 microseconds to 0.4 microseconds.

\* \* \* \* \*